(12) United States Patent
Kim

(10) Patent No.: US 12,344,133 B2
(45) Date of Patent: Jul. 1, 2025

(54) POWER SWIVEL DEVICE OF SEAT FOR VEHICLE

(71) Applicant: DAS CO., LTD, Gyeongju-si (KR)

(72) Inventor: Tae Youn Kim, Suwon-si (KR)

(73) Assignee: DAS CO., LTD., Gyeongju-si (KR)

( * ) Notice: Subject to any disclaimer, the term of this patent is extended or adjusted under 35 U.S.C. 154(b) by 221 days.

(21) Appl. No.: 17/972,128

(22) Filed: Oct. 24, 2022

(65) Prior Publication Data
US 2023/0139845 A1 May 4, 2023

(30) Foreign Application Priority Data

Oct. 28, 2021 (KR) ........................ 10-2021-0145362

(51) Int. Cl.
*B60N 2/02* (2006.01)
*B60N 2/14* (2006.01)

(52) U.S. Cl.
CPC .......... *B60N 2/14* (2013.01); *B60N 2002/022* (2013.01)

(58) Field of Classification Search
CPC ............................................. B60N 2002/022
See application file for complete search history.

(56) References Cited

U.S. PATENT DOCUMENTS

| | | | |
|---|---|---|---|
| 2014/0167472 A1 | 6/2014 | Haller | |
| 2020/0282872 A1 | 9/2020 | Ng et al. | |
| 2024/0308396 A1* | 9/2024 | Kim | B60N 2/14 |

FOREIGN PATENT DOCUMENTS

| | | | | |
|---|---|---|---|---|
| CN | 110901479 A | 3/2020 | | |
| CN | 212529391 U | 2/2021 | | |
| CN | 112455292 A | * 3/2021 | ......... | B60N 2/02253 |
| DE | 19845365 A1 | 4/2000 | | |
| DE | 102019126079 A1 | 4/2020 | | |
| DE | 102019121000 A1 | 6/2020 | | |
| DE | 102020123420 A1 | 3/2021 | | |
| JP | 2004347005 A | 12/2004 | | |
| KR | 1020110034142 A | 4/2011 | | |
| KR | 1020110054714 A | 5/2011 | | |
| KR | 20120005084 A | 1/2012 | | |
| KR | 1020190048405 A | 5/2019 | | |
| KR | 102349791 B1 | * 1/2022 | | |

OTHER PUBLICATIONS

DE Office Action for corresponding DE Application No. 102022128397. 6, dated Sep. 11, 2023, pp. 1-7.
Chinese Office Action for CN patent application No. 202211268692. 9, dated Jul. 11, 2024, 4 pages.
Korean Office Action for KR application No. 10-2021-0145362, dated Mar. 31, 2025, 4 pages.

* cited by examiner

*Primary Examiner* — Timothy J Brindley
(74) *Attorney, Agent, or Firm* — Tarolli, Sundheim, Covell & Tummino LLP

(57) ABSTRACT

The present disclosure relates to a power swivel device for a vehicle seat where a brake unit is installed between a fixed plate mounted to a seat rail and a rotating plate mounted to a seat. The brake unit delivers rotational force of the motor to the rotating plate when the motor is operated and constrains a flow in a rotational direction of the rotating plate when the motor is stopped. Accordingly, it is possible to prevent a flow of a seat in a rotational direction due to gear backlash.

6 Claims, 5 Drawing Sheets

[Fig. 1]
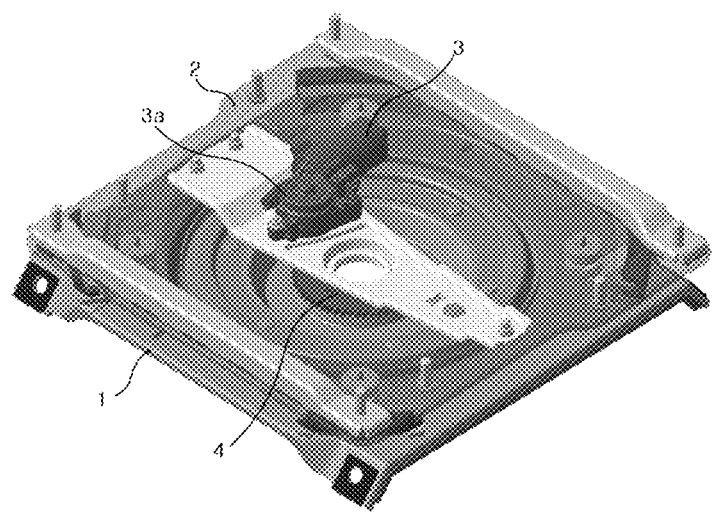
[Fig. 2]
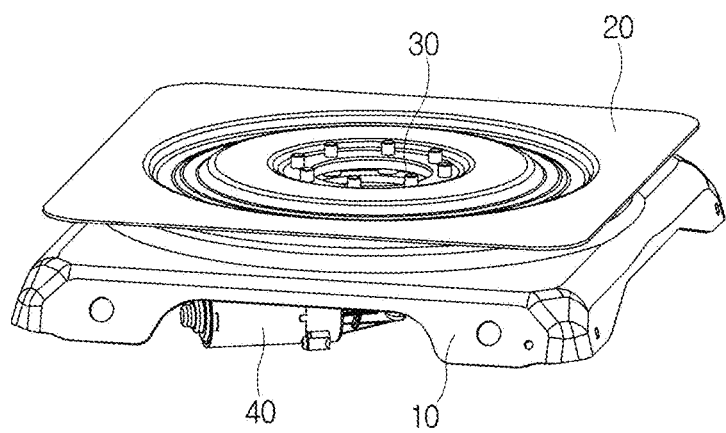

[Fig. 3]
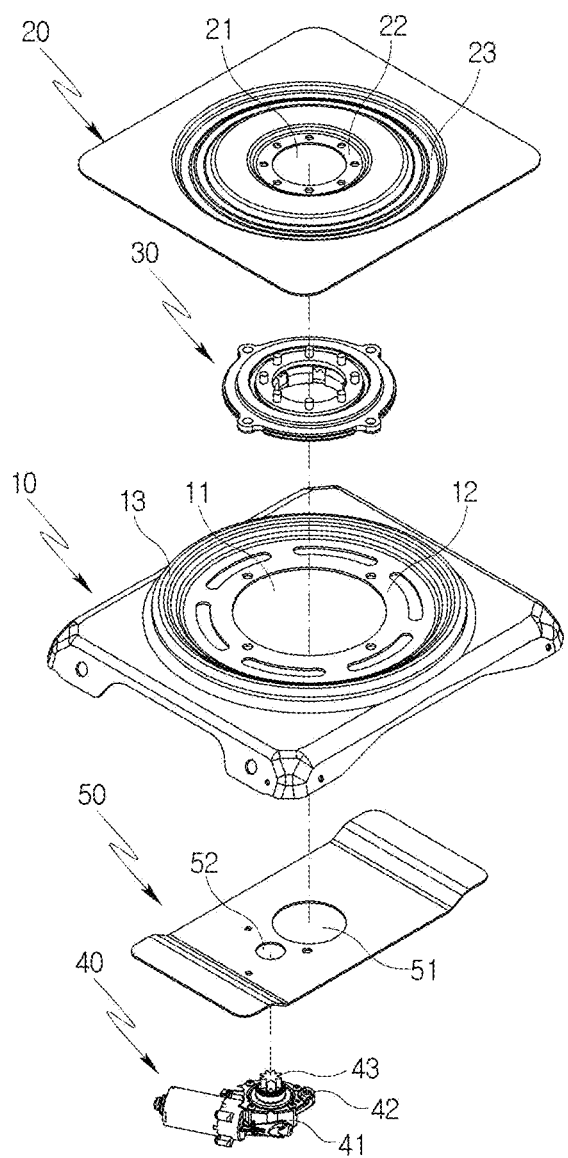

[Fig. 4]
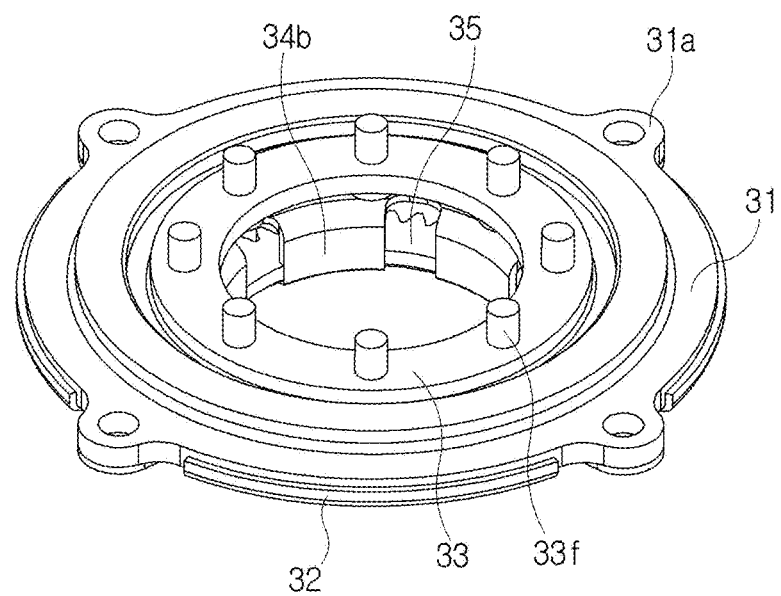
[Fig. 5]
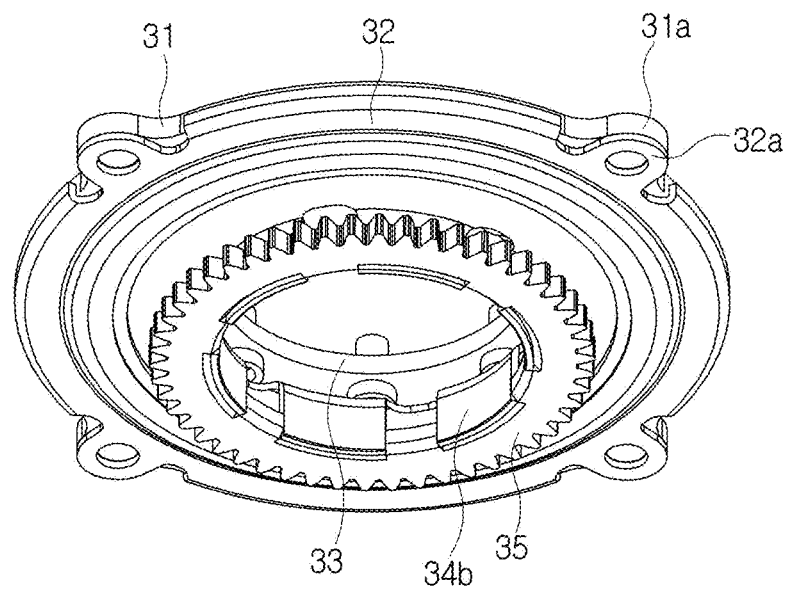

[Fig. 6]
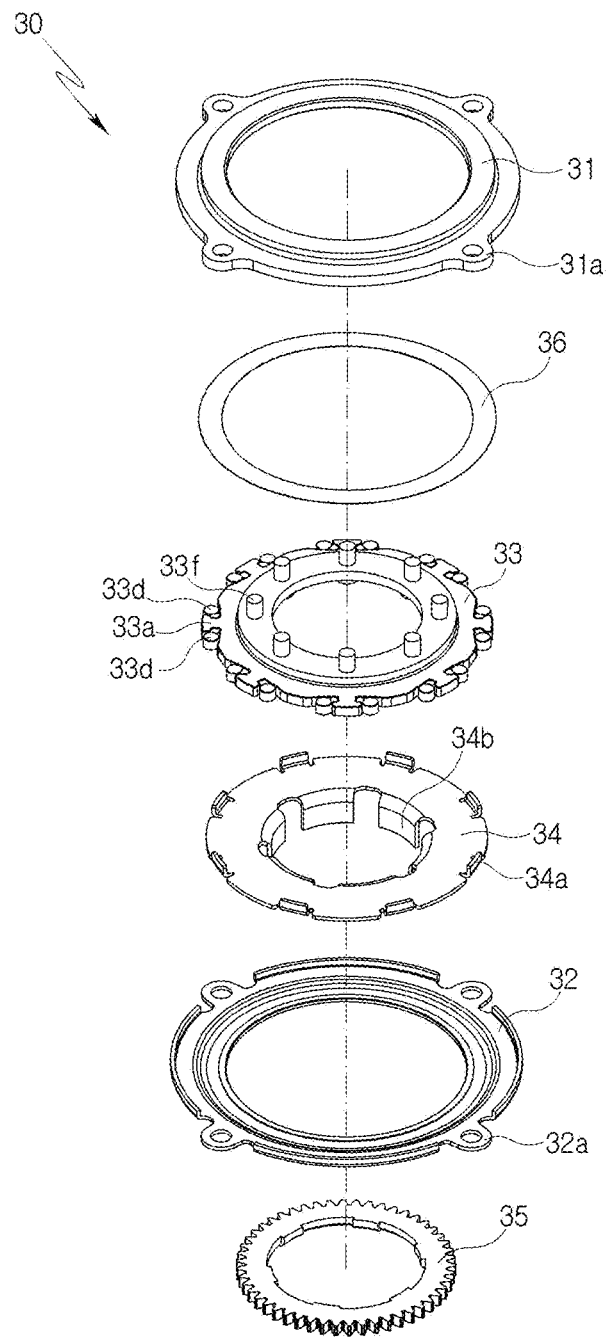

[Fig. 7]
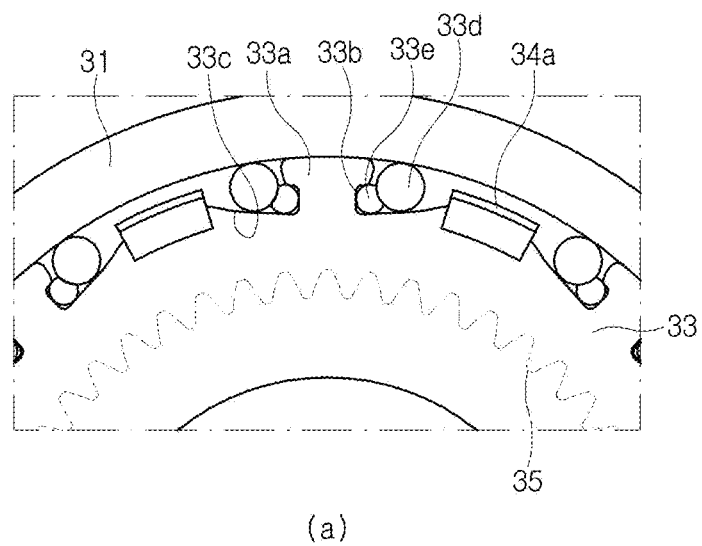
(a)
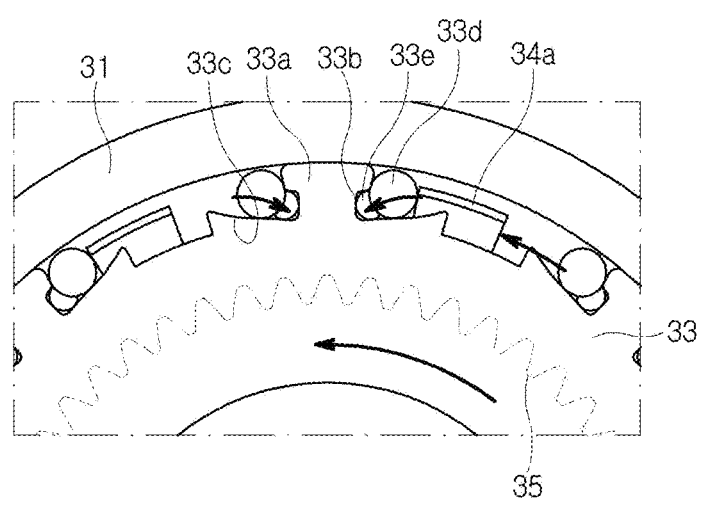
(b)

POWER SWIVEL DEVICE OF SEAT FOR VEHICLE

CROSS REFERENCE TO RELATED APPLICATION

The present application claims priority to Korea Patent Application No. 10-2021-0145362, filed Oct. 28 2021, the entire contents of which is incorporated herein for all purposes by this reference.

TECHNICAL FIELD

The present invention relates to a power swivel device for a vehicle seat, and more particularly, to a power swivel device for automatically rotating a vehicle seat by driving a motor.

BACKGROUND ART

Various components are provided as part of the vehicle seat in order to provide enhanced ride comfort and convenience to a driver or passenger. For example, a seat track device capable of moving a vehicle seat in a front-rear direction according to a body shape of an occupant, a leg rest device for supporting a leg portion of a passenger, and the like are applied.

In addition, as electric vehicles become popular in recent years, securing an interior space of a vehicle becomes easy, and as autonomous driving technology is greatly developed, interest in activities other than driving in an indoor space of a vehicle while driving is increasing.

Therefore, in addition to a general driving mode, a seat structure for implementing various modes such as a conversation mode between passengers and a relaxation mode is being developed, and a representative example of this is a swivel seat in which a direction of a seat can be freely adjusted.

Such a swivel seat is currently mainly applied to a second row of a multi-purpose vehicle, and it is aimed to apply the swivel seat to a driver's seat on the premise of practical use of fully autonomous driving technology.

As illustrated in FIG. 1, a power swivel device for a vehicle seat according to prior art is configured that a motor 3 is installed on one side of two plates 1 and 2 coupled to be rotated with each other, and driving gear 4 engaged with an output gear of the motor 3 is fixedly installed on another side.

Therefore, when driving the motor 3 in a state where one of the two plates 1 and 2 is fixed to the seat rail and the seat is installed on the other plate, the plate on which the seat is installed is rotated, so that a direction of the seat can be adjusted as desired.

However, since the motor 3 is a geared motor provided with a gearbox 3a for deceleration, there is backlash between a plurality of gears inside the gearbox 3a, and backlash also exists between the final output gear of the gearbox 3a and the driving gear 4, thus there is a clearance between the fixed plate and the rotating plate of the swivel device in a rotational direction.

Therefore, there was a problem that a flow in a rotational direction occurred in the seat, which not only reduced the stability of the seat, but also generated noise from the seat while the vehicle was driving.

DOCUMENT OF RELATED ART

Patent Document

Korean Patent Laid-Open Publication No. 10-2019-0048405 (published on May 9 2019)

DISCLOSURE

Technical Problem

Accordingly, the present invention has been devised to solve the above problems, and the purpose of the present invention is to provide a power swivel device for a vehicle seat in which the stability of the seat is improved and noise generation is prevented by eliminating a clearance in a rotational direction.

Technical Solution

One embodiment is a power swivel device for a vehicle seat including: a fixed plate fixed to a seat rail of an interior floor of a vehicle; a rotating plate rotatably installed on the fixed plate and mounted to a seat; a motor installed on a side of the fixed plate; and a brake unit installed between the fixed plate and the rotating plate, delivering rotational force of the motor to the rotating plate when the motor is operated, and constraining a flow in a rotational direction of the rotating plate when the motor is stopped.

A circular guide part is formed to protrude upward on the fixed plate, a circular guide part is formed to protrude downward on the rotating plate, and the guide part of the fixed plate surrounds an outside of the guide part of the rotating plate to constrain a radial flow between the fixed plate and the rotating plate.

The brake unit includes: a drum housing and a housing cover coupled to each other to form a part installation space therein; a brake plate installed between the drum housing and the housing cover, having a plurality of wedge bosses formed on an outer circumferential surface and having a wedge surface forming a low inclination toward the wedge boss and a high inclination on an opposite side thereof on both sides of the wedge boss; a wedge roller provided between the wedge surface and an inner circumferential surface of the drum housing to constrain rotation of the brake plate by being sandwiched between the wedge surface and the inner circumferential surface of the drum housing when the brake plate rotates; and an elastic member installed inside a wedge groove formed on a side surface of the wedge boss to push the wedge roller upward from the wedge surface.

A plurality of bolts are provided on one side of the brake plate, the bolts are exposed to an outside through an inner diameter section of the drum housing, and the bolts are tightened to a mounting part of the rotating plate.

A driving plate is provided between the brake plate and the housing cover, and operating pieces are disposed respectively between the wedge bosses on an outer circumferential surface of the driving plate, and coupling pieces protruding outward through an inner diameter section of the housing cover are formed on an inner circumferential surface of the driving plate, and the coupling pieces are inserted into and welded to the inner diameter section of a driving gear located outside the housing cover.

Bolt tightening portions abutting each other on outer circumferential surfaces of the drum housing and the housing cover are formed to protrude, and the bolt tightening portions are bolted to a mounting part of the fixed plate.

A circumferential surface portion is formed between the wedge surfaces on both sides between the wedge bosses adjacent to each other of the brake plate, and the operating pieces of the driving plate is formed in an arc shape having the same curvature as the circumferential surface portion, and is in contact with the circumferential surface portion.

A mounting plate is installed at a gap to a bottom of the fixed plate, a motor is mounted on the mounting plate, and an output gear of the motor is engaged with the driving gear of the brake unit.

Advantageous Effect

According to the present invention as described above, the brake unit is installed between the fixed plate and the rotating plate of the swivel device, so that a flow in a rotational direction does not occur between the fixed plate and the rotating plate.

Therefore, a flow in a rotational direction does not occur in the seat, so the stability of the seat is improved, and noise according to a flow in a rotational direction of the seat is not generated during driving.

As described above, the stability of seat fixation is improved, and noise is not generated, thereby emotional quality of a seat is improved.

DESCRIPTION OF DRAWINGS

FIG. 1 is a perspective view of the power swivel device according to prior art.

FIG. 2 is a perspective view of the power swivel device according to the present disclosure.

FIG. 3 is an exploded view of the power swivel device according to the present disclosure.

FIG. 4 is a top perspective view of the brake unit, which is a main component of the present disclosure.

FIG. 5 is a bottom perspective view of the brake unit.

FIG. 6 is an exploded view of the brake unit.

FIG. 7 is a partial enlarged view of the brake unit, and (a) is a brake plate in a fixed state, while (b) is a brake plate in a released state.

DETAILED DESCRIPTION

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. In the drawings, the thicknesses of lines illustrated in the accompanying drawings and dimensions of elements may be exaggerated for clarity and convenience.

The following terms are defined considering functions of the disclosure, and may be changed according to the intent of users or operators, or conventional practice. Therefore, the terms will be defined throughout the content of this description.

Hereinafter, exemplary embodiments will be fully described with reference to the accompanying drawings.

As illustrated in FIGS. 2 and 3, a power swivel device for a vehicle seat according to the present disclosure includes: a fixed plate 10 fixed to a seat rail of an interior floor of a vehicle; a rotating plate 20 rotatably installed on the fixed plate and fixed to a lower part of a seat; a brake unit 30 installed between the fixed plate 10 and the rotating plate 20 and preventing a flow of the rotating plate 20 in a rotational direction, and a motor 40 installed on a side of the fixed plate and delivering rotational force to the rotating plate 20.

The fixed plate 10 has an approximately rectangular shape and is fixed to an upper rail of a seat rail installed on a floor of a vehicle. A circular through hole 11 is formed in a center of the fixed plate 10 so that a driving gear of the brake unit 30 can protrude downward, and a mounting part 12 for mounting the brake unit 30 around the through hole 11 is formed.

The mounting part 12 is a circumferential portion of the through hole 11 and a plurality of bolt holes are formed to mount bolt tightening portions formed on a circumference of the brake unit 30.

In addition, on an upper surface of the fixed plate 10, a circular guide part 13 concentric with the through hole 11 and the mounting part 12 is formed around the mounting part 12. The guide part 13 is made of a multi-stage curved surface and is formed to protrude upward of the fixed plate 10 as a whole.

The rotating plate 20 is fixedly mounted to a lower part of the seat and is a rectangular plate-shaped part with a shape and area similar to that of the fixed plate 10.

A circular through hole 21 is also formed in a center of the rotating plate 20, and a mounting part 22 in which a plurality of bolt holes are formed in a circumference of the through hole 21 is formed in the rotating plate 20. The brake plate of the brake unit 30 is bolted to the mounting part 22 of the rotating plate 20.

Also, on the rotating plate 20, a circular guide part 23 concentric with the through hole 21 and the mounting part 22 is formed in a circumference of the mounting part 22. The guide part 23 of the rotating plate 20 also has a multi-stage curved surface, but is formed to protrude downward of the rotating plate 20 in response to the guide part 13 of the fixed plate 10.

When the guide part 13 of the fixed plate 10 is formed with a larger diameter than that of the guide part 23 of the rotating plate 20, and the fixed plate 10 and the rotating plate 20 are assembled through the brake unit 30, the guide part 13 of the fixed plate 10 is designed to wrap the guide part 23 of the rotating plate 20 from the outside thereof.

Therefore, when the seat swivel is operated, the rotating plate 20 may be rotated smoothly with respect to the fixed plate 10 without interference, and even when a large impact is applied to the seat due to a collision accident, etc., the guide parts 13 and 23 constrain the fixed plate 10 and the rotating plate 20 in a radial direction so that the seat is not separated from the mounting position.

The brake unit 30 serves to assemble the rotating plate 20 to the fixed plate 10 with the rotating plate 20 in a rotatable state, deliver rotational force of the motor 40 to the rotating plate 20 to rotate the seat, and generate braking force against rotational force coming from the seat when the motor 40 is stopped and maintain the stopped state, thereby fixing the seat in a non-rotatable state. A detailed configuration of the brake unit 30 will be described again below.

The motor 40 is fixedly installed below the fixed plate 10 through the mounting plate 50. The mounting plate 50 is a metal plate installed at a predetermined gap to a bottom of the fixed plate 10, and it is preferable to weld the mounting plate 50 to the fixed plate 10.

The motor 40 is a geared motor that is integrally equipped with a gear box 41 for deceleration, and a mounting bracket 42 is provided on the gear box 41. An output gear 43 of the gear box 41 protrudes upward through a central portion of the mounting bracket 42.

In a center of the mounting plate 50, a through hole 51 of which a center coincides with centers of the through hole 11 of the fixed plate 10 and the through hole 21 of the rotating plate 20 is formed, and a gear hole 52 into which the output gear 43 is inserted is formed on an outer side of the through hole 51.

The mounting bracket 42 is bolted to an underside of the mounting plate 50 so that the output gear 43 is inserted into the gear hole 52. In an assembled state, the output gear 43 of motor 40 is engaged with the driving gear of brake unit 30.

The brake unit 30, which is a main component of the present disclosure, will be described with reference to FIGS. 4 to 6. FIG. 4 is a top perspective view of the brake unit; FIG. 5 is a bottom perspective view of the brake unit and FIG. 6 is an exploded view of the brake unit.

The brake unit 30 is formed to have a structure where a brake plate 33, a driving plate 34, a side plate 36, a wedge roller 33d and the like are installed between a drum housing 31 and a housing cover 32, and the driving gear 35 is mounted to the driving plate 34 on an outside of the housing cover 32.

The drum housing 31 and the housing cover 32 are welded to each other and form a space therebetween to accommodate the components. A plurality of bolt tightening portions 31a and 32a which are abutted to each other are formed at the same position on respective outer circumferential surfaces of the drum housing 31 and the housing cover 32, and bolt holes are formed in the bolt tightening portions 31a and 32a. The bolt tightening portions 31a and 32a are bolted to the mounting part 12 of the fixed plate 10.

As shown in FIGS. 6 and 7, the brake plate 33 has wedge bosses 33a formed on its outer circumferential surface at equal intervals in a circumferential direction. On both sides of the wedge boss 33a, wedge grooves 33b having a narrower width toward an inside are formed. With respect to the wedge boss 33a, bottom surfaces of both wedge grooves 33b are wedge surfaces 33c, and the wedge surfaces 33c gets lowered toward the wedge boss 33a (a distance from an inner circumferential surface of the drum housing 31 increases), and the wedge surfaces 33c gets higher as a distance from the wedge boss 33a increases (a distance from the inner circumferential surface of drum housing 31 decreases).

Wedge rollers 33d are provided on both sides of the wedge boss 33a, respectively, and the wedge rollers 33d are elastically supported by elastic members 33e inserted inward of the wedge grooves 33b. The elastic member 33e pushes the wedge roller 33d toward an upper portion of the wedge surface 33c to sandwich the wedge roller 33d between an inner circumferential surface of the drum housing 31 and the wedge surface 33c.

The driving plate 34 and the side plate 36 are provided on both sides of the brake plate 33 to prevent the wedge roller 33d and the elastic member 33e from disengaging in an axial direction of the brake plate 33.

A plurality of bolts 33f are installed on one side of the brake plate 33 in a circumferential direction, and portions where the bolts 33f are installed protrude in a direction of one side of the brake unit 30 through the through hole of the drum housing 31. The bolts 33f are tightened to the mounting part 22 of the rotating plate 20. Since the rotating plate 20 is fixed to the underside of the seat, the brake plate 33 rotates integrally with the seat.

The driving plate 34 has operating pieces 34a protruding toward the brake plate 33 on an outer circumferential surface thereof. The operating pieces 34a are formed in the same number as the wedge boss 33a of the brake plate 33 and are positioned between the wedge bosses 33a.

Meanwhile, a portion between the wedge surfaces 33c of the brake plate 33 between adjacent wedge bosses 33a is formed as a circumferential surface (circumferential surface portion 33g). In addition, the operating piece 34a is also formed in an arc shape having the same curvature as that of the circumferential surface portion 33g and is in contact with (or slightly spaced from) the circumferential surface portion 33g. In this state, when the driving plate 34 is rotated, the operating piece 34a slides along the circumferential surface portion 33g and is rotatably moved.

Since an end of the wedge boss 33a of the driving plate 34 is in contact with an inner circumferential surface of the drum housing 31, as described above, the operating piece 34a of the driving plate 34 is in contact with the circumferential surface portion 33g of the brake plate 33, so that centers of rotation of the drum housing 31, the brake plate 33, and the driving plate 34 coincide, thereby helping accurately maintain coaxial relationship between parts.

Meanwhile, a plurality of coupling pieces 34b are formed to protrude toward the housing cover 32 on an inner circumferential surface of the driving plate 34. The coupling pieces 34b are inserted into and seat on an inner diameter surface of the driving gear 35 located outside the housing cover 32 and are welded to the inner diameter surface. Therefore, the driving gear 35 and the driving plate 34 are rotated integrally.

The assembled state of the brake unit 30 assembled in the above-described structure can be seen in FIGS. 4 and 5.

For the brake unit 30, the bolt tightening portions 31a and 32a are bolted to the mounting part 12 of the fixed plate 10. In the mounted state, the driving gear 35 of the brake unit 30 protrudes downward from the fixed plate 10 through the inner diameter section of the fixed plate 10, and the output gear 43 of the motor 40 is engaged with the driving gear 35.

Now, the advantageous effect of the present disclosure will be described.

A seat is fixed to a seat rail of a vehicle floor through the power swivel device according to the present disclosure. In a normal use state (motor 40 is in an off-state), a state of the brake unit 30 is that the wedge roller 33d is pushed up to a high side of the wedge surface 33c by the elastic member 33e, as shown in FIG. 7(a).

In the above state, when an external force is applied to the seat in a rotational direction, rotational force is delivered to the brake plate 33 connected to the seat, and rotation of the brake plate 33 becomes impossible because the wedge roller 33d opposite to a rotational direction with respect to the wedge boss 33a is caught between an inner circumferential surface of the drum housing 31 and the wedge surface 33c of the brake plate 33. Since wedge rollers 33d are provided on both sides of the wedge boss 33a, the brake plate 33 cannot rotate in both directions. As such, the rotation of the brake plate 33 is constrained by the wedge roller 33d being caught, so there is no clearance in a rotational direction between the drum housing 31 and the brake plate 33 and accordingly, no flow in the rotational direction occurs in the seat. Therefore, stability of the seat fixation in a rotational direction is greatly improved.

Meanwhile, when the user manipulates operation button (switch) of the power swivel device to supply power to the motor 40 and the motor 40 is rotated in one direction, the output gear 43 of the motor 40 is rotated, the driving gear 35 engaged with the output gear 43 is rotated, and the driving plate 34 is rotated integrally with the driving gear 35.

When the driving plate 34 is rotated, as shown in FIG. 7(b), the operating piece 34a of the driving plate 34 moves in a rotational direction to push the wedge roller 33d in front in the rotational direction. Accordingly, as the wedge roller 33d moves downward of the wedge surface 33c, the constraint state of the brake plate 33 with respect to the drum housing 31 is released.

The wedge roller 33d pushed downward of the wedge surface 33c comes into contact with an upper side of the wedge boss 33a and a middle portion of the wedge surface 33c.

Accordingly, the rotational force of the driving plate 34 is delivered to the brake plate 33 through the operating piece 34a, the wedge roller 33d, and the wedge boss 33a, thereby rotating the brake plate 33.

When the wedge roller 33d on one side of the wedge boss 33a is pushed by the operating piece 34a, the wedge roller 33d on an opposite side of the wedge boss 33a moves to a lower part of the corresponding wedge surface 33c by the rotation of the brake plate 33. That is, the wedge roller 33d on an opposite side of the wedge boss 33a also cannot constrain the rotation of the brake plate 33 with respect to the drum housing 31.

Therefore, when the driving plate 34 is rotated by the operation of the motor 40, the brake plate 33 is rotated in the direction of the rotation, and the seat connected to the brake plate 33 is rotated, thereby adjustment of the direction of the seat is made available.

As described above, in the power swivel device according to the present disclosure, the brake unit 30 that firmly maintains a fixed state in a rotational direction without a flow is installed between the fixed plate 10 and the rotating plate 20, thereby no flow in the rotational direction between the fixed plate 10 and the rotating plate 20 occurs.

Therefore, the flow in the rotational direction does not occur in the seat, so stability of the seat fixation in the rotational direction is improved, and noise due to the flow of the seat in the rotational direction is not generated while driving.

As described above, the stability of the seat fixation is improved and noise is not generated, thereby improving the emotional quality of the seat.

While the present disclosure has been particularly shown and described with reference to embodiments thereof, these embodiments are provided so that this disclosure will fully convey the concept of the present disclosure, and not for purposes of limitation. Thus, it will be obvious to one of ordinary skill in the art that various changes and other equivalents may be made therein. Therefore, the protective scope of the present disclosure is defined by the appended claims below.

[REFERENCE NUMERALS]

| | |
|---|---|
| 10: fixed plate | 20: rotating plate |
| 30: brake unit | 31: drum housing |
| 32: housing cover | 33: brake plate |
| 34: driving plate | 35: driving gear |
| 36: side plate | 40: motor |
| 43: output gear | 50: mounting plate |

The invention claimed is:

1. A power swivel device for a vehicle seat comprising:
a fixed plate fixed to a seat rail of an interior floor of a vehicle;
a rotating plate rotatably installed on the fixed plate and mounted to a seat;
a motor installed on a side of the fixed plate; and
a brake unit installed between the fixed plate and the rotating plate, delivering rotational force of the motor to the rotating plate when the motor is operated, and constraining a flow in a rotational direction of the rotating plate when the motor is stopped and
wherein the brake unit comprises:
a drum housing and a housing cover coupled to each other to form a part installation space therein;
a brake plate installed between the drum housing and the housing cover, having a plurality of wedge bosses formed on an outer circumferential surface and having a wedge surface forming a low inclination toward the wedge boss and a high inclination on an opposite side thereof on both sides of the wedge boss;
a wedge roller provided between the wedge surface and an inner circumferential surface of the drum housing to constrain rotation of the brake plate by being sandwiched between the wedge surface and the inner circumferential surface of the drum housing when the brake plate rotates; and
an elastic member installed inside of a wedge groove formed on a side surface of the wedge boss to push the wedge roller upward from the wedge surface, and
wherein a driving plate is provided between the brake plate and the housing cover, and
operating pieces are disposed respectively between the wedge bosses on an outer circumferential surface of the driving plate, and
coupling pieces protruding outward through an inner diameter section of the housing cover are formed on an inner circumferential surface of the driving plate, and
the coupling pieces are inserted into and welded to an inner diameter section of a driving gear located outside the housing cover.

2. The power swivel device for a vehicle seat of claim 1, wherein a circular guide part is formed to protrude upward on the fixed plate,
a circular guide part is formed to protrude downward on the rotating plate, and
the guide part of the fixed plate surrounds an outside of the guide part of the rotating plate to constrain a radial flow between the fixed plate and the rotating plate.

3. The power swivel device for a vehicle seat of claim 1, wherein a plurality of bolts are provided on one side of the brake plate, the bolts are exposed to an outside through an inner diameter section of the drum housing, and the bolts are tightened to a mounting part of the rotating plate.

4. The power swivel device for a vehicle seat of claim 1, wherein bolt tightening portions abutting each other on outer circumferential surfaces of the drum housing and the housing cover are formed to protrude, and the bolt tightening portions are bolted to a mounting part of the fixed plate.

5. The power swivel device for a vehicle seat of claim 1, wherein a circumferential surface portion is formed between the wedge surfaces on both sides between the wedge bosses adjacent to each other of the brake plate, and the operating pieces of the driving plate is formed in an arc shape having the same curvature as the circumferential surface portion, and is in contact with the circumferential surface portion.

6. The power swivel device for a vehicle seat of claim 1, wherein a mounting plate is installed at a gap to a bottom of the fixed plate, a motor is mounted on the mounting plate, and an output gear of the motor is engaged with the driving gear of the brake unit.

\* \* \* \* \*